United States Patent
Haulin et al.

(10) Patent No.: US 7,860,952 B2
(45) Date of Patent: Dec. 28, 2010

(54) SERVICE AND MAINTENANCE SOLUTIONS FOR PROGRAMMABLE AND/OR RECONFIGURABLE MODULES INCLUDED IN COMMUNICATION NETWORK NODES

(75) Inventors: Tord Haulin, Uppsala (SE); Tume Römer, Ekerö (SE)

(73) Assignee: Finisar Corporation, Sunnyvale, CA (US)

( * ) Notice: Subject to any disclaimer, the term of this patent is extended or adjusted under 35 U.S.C. 154(b) by 572 days.

(21) Appl. No.: 10/507,397

(22) PCT Filed: Mar. 3, 2003

(86) PCT No.: PCT/SE03/00355

§ 371 (c)(1),
(2), (4) Date: Sep. 13, 2005

(87) PCT Pub. No.: WO03/079702

PCT Pub. Date: Sep. 25, 2003

(65) Prior Publication Data

US 2006/0179128 A1 Aug. 10, 2006

(30) Foreign Application Priority Data

Mar. 18, 2002 (SE) .................................. 0200812-6

(51) Int. Cl.
*G06F 15/177* (2006.01)
*G06F 3/00* (2006.01)
(52) U.S. Cl. .................. 709/220; 709/221; 710/15; 710/20; 710/21; 370/351; 370/360; 398/135; 713/168; 713/176; 717/176; 717/178
(58) Field of Classification Search .................. 710/20; 709/220
See application file for complete search history.

(56) References Cited

U.S. PATENT DOCUMENTS 5,185,853 A * 2/1993 Cheng et al. ................ 358/1.16

(Continued)

FOREIGN PATENT DOCUMENTS

EP 0917077 5/1998

(Continued)

OTHER PUBLICATIONS

IBM Technical Disclosure Bulletin NB940491, Apr. 1994, 'Universal Wireless Connectivity for Portable Computers'.*

(Continued)

*Primary Examiner*—Henry W Tsai
*Assistant Examiner*—Steven G Snyder
(74) *Attorney, Agent, or Firm*—Workman Nydegger

(57) ABSTRACT

The present invention relates to service and maintenance solutions for programmable and/or reconfigurable modules ($CM_1$, . . . , $CM_n$), which are included in the nodes of a communications network (140). The module ($CM_1$) contains a first digital storage unit (M1), which holds information pertaining to the accomplishment of a primary function of the module. A secondary function of the module involves control of the primary function. The module has an optical bi-directional interface ($I_w$) towards the first digital storage unit. Data in the first digital storage unit may be read out ($D_o$) and may also be updated ($D_i$) by the portable software carrier unit via the optical bi-directional interface. Data read-out as well as data updating may be accomplished independently of the primary function. Preferably, an access module (A) controls the bi-directional interface in response to an authorization signal (SA) from an authorization unit (120, 121, 122, 123).

12 Claims, 2 Drawing Sheets

U.S. PATENT DOCUMENTS

| | | | | |
|---|---|---|---|---|
| 5,524,135 | A | 6/1996 | Mizikovsky et al. | 455/419 |
| 5,564,070 | A * | 10/1996 | Want et al. | 455/507 |
| 5,668,654 | A * | 9/1997 | Benjamin et al. | 398/139 |
| 5,761,397 | A * | 6/1998 | Bagley et al. | 358/1.15 |
| 5,764,863 | A * | 6/1998 | Fall et al. | 358/1.13 |
| 5,815,732 | A | 9/1998 | Cooper et al. | 710/36 |
| 5,903,545 | A * | 5/1999 | Sabourin et al. | 370/225 |
| 5,974,312 | A * | 10/1999 | Hayes et al. | 455/419 |
| 6,006,275 | A * | 12/1999 | Picazo et al. | 709/249 |
| 6,012,103 | A | 1/2000 | Sartore et al. | 710/8 |
| 6,111,673 | A * | 8/2000 | Chang et al. | 398/79 |
| 6,122,759 | A * | 9/2000 | Ayanoglu et al. | 714/57 |
| 6,130,881 | A * | 10/2000 | Stiller et al. | 370/238 |
| 6,292,464 | B1 * | 9/2001 | Elahmadi et al. | 370/223 |
| 6,317,837 | B1 * | 11/2001 | Kenworthy | 726/11 |
| 6,763,007 | B1 * | 7/2004 | La Porta et al. | 370/331 |
| 6,785,765 | B1 * | 8/2004 | Roohparvar | 711/103 |
| 6,859,197 | B2 * | 2/2005 | Klein et al. | 345/158 |
| 6,892,251 | B2 * | 5/2005 | Anderson et al. | 710/20 |
| 6,934,248 | B1 * | 8/2005 | DeBoer et al. | 370/217 |
| 6,952,780 | B2 * | 10/2005 | Olsen et al. | 726/26 |
| 6,956,833 | B1 * | 10/2005 | Yukie et al. | 370/328 |
| 7,426,179 | B1 * | 9/2008 | Harshavardhana et al. | 370/219 |
| 7,739,302 | B2 * | 6/2010 | Kenworthy | 707/783 |
| 2001/0023461 | A1 * | 9/2001 | Hara et al. | 709/321 |
| 2002/0012318 | A1 * | 1/2002 | Moriya et al. | 370/225 |
| 2002/0041568 | A1 * | 4/2002 | Bender | 370/238 |
| 2002/0049899 | A1 * | 4/2002 | Kenworthy | 713/1 |
| 2002/0093424 | A1 * | 7/2002 | Parry | 340/539 |
| 2003/0033599 | A1 * | 2/2003 | Rajaram et al. | 717/173 |
| 2003/0067738 | A1 * | 4/2003 | Rudd et al. | 361/680 |
| 2003/0120925 | A1 * | 6/2003 | Rose et al. | 713/176 |
| 2003/0204726 | A1 * | 10/2003 | Kefford et al. | 713/171 |
| 2004/0066777 | A1 * | 4/2004 | Vesterinen et al. | 370/352 |
| 2007/0027990 | A1 * | 2/2007 | Nakaoka et al. | 709/226 |
| 2007/0159971 | A1 * | 7/2007 | Zhang et al. | 370/230 |

FOREIGN PATENT DOCUMENTS

| | | |
|---|---|---|
| EP | 1043868 | 11/2000 |
| WO | 9814014 | 4/1998 |
| WO | WO 0159622 A2 | 8/2001 |
| WO | WO 0169888 A1 | 9/2001 |
| WO | WO 0217098 A1 | 2/2002 |

OTHER PUBLICATIONS

International Search Report, Swedish Patent Office, dated May 27, 2003.

* cited by examiner

SERVICE AND MAINTENANCE SOLUTIONS FOR PROGRAMMABLE AND/OR RECONFIGURABLE MODULES INCLUDED IN COMMUNICATION NETWORK NODES

BACKGROUND OF THE INVENTION

1. Field of the Invention

The present invention relates generally to service and maintenance solutions for programmable and/or reconfigurable modules, which are included in nodes of a communications network. More particularly the invention relates to a communication module and a method of communicating with such a module.

2. Description of Related Art

The term communication module is here understood to designate arbitrary type of unit, which is adapted to exchange information with at least one other unit over a communications network. The communication module may thus be a line card or an optoelectrical transceiver in a switch or a router as well as a general-purpose computer with networking capabilities.

Data communication equipment such as switches, routers, etc. have until recently had limited maintenance functionality. With today's high capacity networks however, maintenance and reliability are of growing importance. For instance, so-called carrier class services are offered also in data networks. These higher service levels have become cost efficient by use of new technology and methods applied to everything from components to system architecture. An important contribution to the improved reliability and availability comes from surveillance and maintenance functions in combination with modular system architectures that are reconfigurable during operation. There are two main concepts for handling maintenance and control communication between managed parts of the system and the management software. Either the management is accomplished by means of physically separated channels or the management system uses integrated virtual channels, which share the same medium as the payload traffic. The present invention may be used both in networks having physically separated management channels and in networks with integrated virtual channels.

A fair amount of maintenance operations may generally be performed without manual intervention. However, addition, removal and replacement of hardware require manual operations. This is normally also true for software and firmware upgrades. Typically, there is an operator interface towards each node in a communications network. This interface allows an operator to supervise and control various functions in the nodes. The operator interface can be handled via a management computer. Depending on network architecture and the node design (which may have a modular structure), the management computer is either located in a centralized location or connected at one or more suitable points in a distributed system.

Management software often has both fully automatic and various forms of operator assisted operation modes. In its simplest form the management software provides a user-interface for the operator's access to information and control of the system. The earlier generations of management systems for modular systems typically had a majority of their functionality located in a centralized management controller. Any removable modules in a node of a network of this type could hence only perform relatively simple management tasks, such as responding to status requests and actuating simple operating mode commands. Today however, the removable modules are generally equipped with much more management, surveillance and debug functions which may be autonomous to a higher degree. Furthermore, some removable modules may be programmed and configured by loading new software or firmware.

The prior art includes many examples of solutions for remote control of the nodes in a network. For instance, European patent application No. 1 043 868 describes an optoelectronic network interface device, which allows reconfiguration of ports in a local area network (LAN) in response to a control signal from a LAN-administrator, a network control center or being automated via dynamic network reconfiguration software.

European patent application No. 0 917 077 discloses a solution for wireless remote synchronization of data between a personal computer (PC) and a personal digital assistant (PDA). According to the document, data files may be automatically updated through a paging or a cellular digital packet data network, both in the PC and in the PDA.

However, the known distributed management functions for communications networks which include modular nodes may be limited by an insufficient capability of the host system management functionality, which results in that only a subset of the potentially available module functions are, in fact, available on the system level. Limitations of this kind could be due to the fact that the removable modules, although they have a standardized interface and standardized physical dimensions, show considerable differences in management handling properties.

Moreover, there may be limitations with respect to the physical access. For example, a large and physically distributed communications network with centralized management functionality may have modular nodes, which are located in areas where the access to the management system is severely restricted, or perhaps even non-existent. Naturally, this may cause problems when performing debug and repair operations that require operator access to both the management system and the module being diagnosed.

SUMMARY OF THE INVENTION

An object of the present invention is therefore to provide a solution for maintenance communication and software updating that alleviates the problems above and thus offers unrestricted access to the functionality of the communication module management irrespective of the specific capabilities of the node to which a relevant communication module is connected and to what degree the management system is accessible from this node.

According to one aspect of the invention this object is achieved by a communication module as described initially, which is characterized in that the bi-directional interface includes at least one optical interface and is adapted to provide a local wireless access to the first digital storage unit. The local wireless access is provided independently of the communication module primary function.

One important advantage accomplished by this design is that the module becomes readily accessible to a support operator, and at the same time, the measures performed with respect to the module can be carried out without influencing the operation of the relevant module. The design is also advantageous with respect to security aspects, since the at least one optical interface requires a physical access to the room in which the node is located in order to manipulate the communication module. Moreover, it is often necessary to open at least one equipment door to actually access the optical interface. Thus, the risk of unauthorized manipulation may be held relatively low.

Other advantages accomplished by the proposed design are related to electromagnetic interference requirements. A communication node, such as an optical transceiver, is normally placed inside an electromagnetic shielded cabinet in order to protect the units therein from interference with external radio signals. Such shielding typically renders an alternative wireless access impossible, for instance by means of a radio interface.

Furthermore, a radio interface may be inappropriate because applicable mechanical/physical restrictions on the communication node may not offer sufficient room for any antennas.

According to another preferred embodiment of this aspect of the invention, the bi-directional interface is adapted to allow read-out of data from the first digital storage unit. Thus, status reports with respect to the primary function may be generated and exported via the bi-directional interface. Preferably, the first digital storage unit contains a first register, which includes status data with respect to the primary function. Moreover, the bi-directional interface is adapted to receive a request for status information and transmit a status report on basis of the request. The status report includes data from the first register, which pertains to at least one parameter of the primary function.

According to another preferred embodiment of this aspect of the invention, the bi-directional interface is adapted to allow updating of the contents of the first digital storage unit. Thereby, the primary function may conveniently be modified by means of software code, firmware code and/or control commands. Preferably, the first digital storage unit includes a second normally volatile register, which is adapted to store information pertaining to accomplishment of the primary function. The bi-directional interface is adapted to receive at least one control command. Furthermore, the module is adapted to alter at least one parameter in the second register pertaining to the accomplishment of the primary function on basis of the at least one control command.

According to another preferred embodiment of this aspect of the invention, the first digital storage unit includes a non-volatile third register, which is adapted to store information pertaining to the accomplishment of the primary function. Moreover, the module contains a second digital storage unit, which is adapted to temporarily store updating information pertaining to the accomplishment of the primary function. The bi-directional interface is adapted to receive at least one piece of information pertaining to accomplishment of the primary function. Additionally, the module is adapted to store the at least one piece of information in the second digital storage unit. This makes it possible to alter the contents of the third register on basis of the at least one piece of information in the second digital storage unit after reset of the module. Consequently, software and firmware upgrades for the primary function may conveniently be achieved via the bi-directional interface.

According to another preferred embodiment of this aspect of the invention, the bi-directional interface contains at least one optical interface, for example adapted to communicate in the infrared wavelength range. Such interface is advantageous because it provides an uncomplicated data transmission while minimizing the risk of unintentional interference with signals that are handled by other units.

According to another preferred embodiment of this aspect of the invention, the communication module includes an access module, which is adapted to allow access to the first digital storage unit via the bi-directional interface. The access module is controllable via an authorization unit; such that it blocks access to the first digital storage unit via the bi-directional interface at least until an authorization signal has been generated for the removable communication module by the authorization unit. An advantage attained thereby is that unauthorized access to the module via the bi-directional interface is prevented.

According to yet another preferred embodiment of this aspect of the invention, the access module contains an authentication sub-unit, which is adapted to receive a pass phrase from a portable software carrier unit via the bi-directional interface. The access module blocks access to the first digital storage unit via the bi-directional interface at least until an acceptable pass phrase has been received. Thus, an advantage attained is that unauthorized access to the module is further prevented.

According to still another preferred embodiment of this aspect of the invention, the authorization signal includes an address field, which designates a specific module position within the node and/or the authorization signal includes a unique identifier of a communication module. Thus, an identification unit in the communication module may indicate an active data transmission state upon reception of an authorization signal that designates the module. This is desirable because it facilitates location of the relevant module, and for instance, guides the operator when aiming the software carrier unit's interface towards the communication module. More important, however, is that the authorization signal ensures activation of the desired module only.

According to a preferred embodiment of this aspect of the invention, the identification unit includes a first optical indicator, which indicates that the bi-directional interface is open for access to the first digital storage unit. Thus, the operator person may confirm that access is granted and that he/she may proceed with the data transmission process.

According to another aspect of the invention this object is achieved by a method of communicating with a communication module, which is removably connected to a node in a communications network. The module is presumed to be adapted to perform a primary function pertaining to an overall operation of the module as well as a secondary function that involves control of the primary function. The method involves the following steps. First, an authorization signal is generated for the removable communication module. This signal is then received in the module. Subsequently, data is exchanged between the removable communication module and a portable software carrier unit via a bi-directional optical interface. The data includes information pertaining to accomplishment of the primary function and the exchange takes place independently of the primary function.

Preferably, the authorization signal includes an address field which designates a specific module position within the node and/or the authorization signal includes a unique identifier of a specific communication module. Thereby, it is made certain that exclusively the desired module is activated by the authorization signal.

According to another preferred embodiment of this aspect of the invention, the method involves receiving a pass phrase in the communication module via the bi-directional wireless interface. Preferably, the pass phrase includes a static segment, a dynamic segment and/or a cyclic redundancy check-sum. In case the pass phrase includes a dynamic segment, this is preferably calculated in the portable software carrier unit and the authorization unit respectively, and access to the first digital storage unit is only granted if there is a match between the results of these two calculations. The cyclic redundancy check-sum is based on data, which is used to update the contents of the digital storage. Consequently, by means of the cyclic redundancy checksum, the integrity of the data transferred to the first digital storage unit can be guaranteed.

According to another preferred embodiment of this aspect of the invention, the method involves updating the contents of the first digital storage unit via the bi-directional interface. The updating may relate to volatile data, such as control commands, or relate to non-volatile definitions of the primary functions in the form of software or firmware code. In the former case, the method preferably involves receiving at least one control command via the bi-directional interface. Then, at least one parameter pertaining to accomplishment of the primary function is altered on basis of the at least one control command. In the latter case, the method preferably involves the following steps. First, at least one piece of information pertaining to accomplishment of the primary function is received via the bi-directional interface. Then, this information is temporarily stored in a second digital storage unit. Subsequently, the communication module is reset. Finally, the content of the first digital storage is altered on basis of the temporarily stored information.

According to another preferred embodiment of this aspect of the invention, the method involves reading out data from the first digital storage unit via the bi-directional interface. Preferably, this is accomplished by first receiving a request for status information via the bi-directional interface, and then transmitting a status report on basis of the request. The status report here includes data pertaining to at least one parameter of the primary function.

Hence, the invention offers an efficient and reliable solution for accomplishing any kind of software and firmware upgrading in arbitrary communications network that includes modular nodes, such as a fiber optical network. Moreover, the invention provides a convenient means for monitoring the function of such nodes. The invention therefore grants a competitive edge to the vast majority of today's data communication systems.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
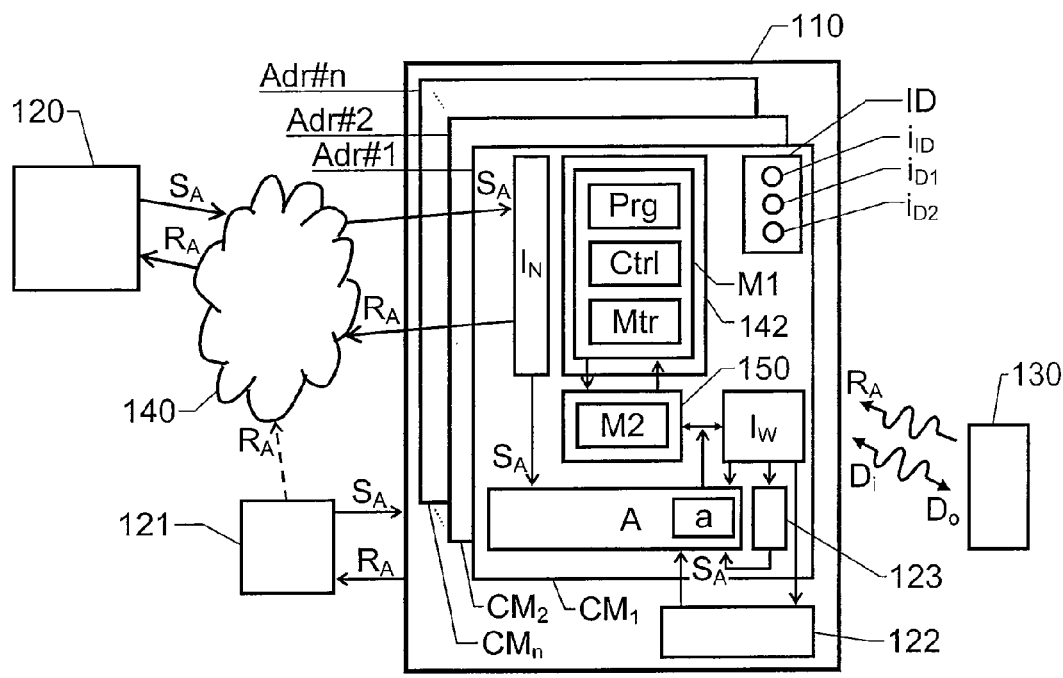
FIG. 1 shows a communication module in a node of a communications network according to an embodiment of the present invention.

FIG. 1 shows a communication module $CM_1$, which is connected to a node 110 of a communications network 140 according to an embodiment of the present invention. A central resource 120, such as a management system server, is also connected to the network 140. In addition to the module $CM_1$, the node 110 includes a plurality of similar communication modules $CM_2, \ldots, CM_n$. Each module $CM_1, \ldots, CM_n$ is located at a module position, which is identified by means of a unique address Adr#1, ..., Adr#n. Typically, the node 110 also contains a variety of other types of units and modules (not shown). The communication module $CM_1$, in turn, contains a first sub-unit 142 including a first digital storage unit M1, a bi-directional wireless interface $I_w$, a network interface $I_N$, an access module A, a local authorization unit 123 and an identification unit ID.

The first digital storage unit M1 is adapted to hold information pertaining to accomplishment of a primary function of the communication module $CM_1$, such as receiving incoming data traffic, performing switching operations and transmitting outgoing data traffic. For this purpose, the first digital storage unit M1 may contain software code, firmware code and/or control parameters. Furthermore, the contents of the first digital storage unit M1 may be modified (e.g. upgraded) $D_i$ via the bi-directional wireless interface $I_w$. Thus, the primary function of the module $CM_1$ may be changed by altering the information in the first digital storage unit M1.

The first digital storage unit M1 in turn contains a first register Mtr, which includes status data for the primary function. Thus, status reports pertaining to parameters of the primary function may be generated on basis of the contents of the first register Mtr. The first digital storage unit M1 also contains a second and volatile register Ctrl, which is adapted to store information pertaining to the accomplishment of the module's $CM_1$ primary function. Thus, parameters in the second register Ctrl, which pertain to the primary function, may be altered on basis of control commands entered via the bi-directional interface $I_w$. Furthermore, the first digital storage unit M1 contains a third and non-volatile register Prg, which is adapted to store information in the form of software and/or firmware that pertains to the accomplishment of the primary function.

A second digital storage unit M2 in a second sub-unit 150 of the module $CM_1$ is adapted to temporarily store the information pertaining to the accomplishment of the primary function, which is to be entered into the register Prg. The content of the register Prg is altered after reset of the module $CM_1$, for instance in connection with a reboot or restart operation.

The communication module $CM_1$ is designed such that it is possible to modify the contents of the first digital storage unit M1 during operation of the module $CM_1$ according to the primary function. Additionally, it is possible to read out $D_o$ the contents of the first digital storage unit M1 via the bi-directional wireless interface $I_w$, such that analysis and diagnosis operations can be performed for the communication module $CM_1$ independently of the primary function.

According to the invention, the bi-directional wireless interface $I_w$ is adapted to provide a local wireless access to the first digital storage unit M1. In practice, this means that a portable software carrier unit 130 (for instance in the form of a personal digital assistant, a palmtop computer, a laptop computer or a mobile telephone) may wirelessly exchange information with the first digital storage unit M1. Preferably, the bi-directional wireless interface $I_w$ includes at least one optical interface, e.g. adapted for transmission of signals in the infra red wavelength range. Thereby, the module $CM_1$ is capable of communicating with the majority of portable software carriers currently on the market.

The access module A has a gate function and is adapted to allow access to the first digital storage unit M1 via the bi-directional wireless interface $I_w$. An authorization unit controls the access module A by means of an authorization signal $S_A$. The authorization unit may be included in the central resource 120 and transmit the authorization signal $S_A$ to the module $CM_1$ via the network interface $I_N$. Alternatively, the authorization may be included in a first local resource 121, which is connected to the node 110 or the unit may be included in a second local resource 122 within the node 110. Optionally, the authorization unit may be included in a third local resource 123 within the module $CM_1$ itself. Preferably, however not necessarily, the authorization unit generates the authorization signal $S_A$ in response to an access request signal $R_A$ from the portable software carrier unit 130. Typically, the access request signal $R_A$ is processed in the relevant authorization unit, i.e. 120, 121, 122 or 123. Nevertheless, according to one embodiment of the invention and in case the authorization unit is located in the first local resource 121, the access request signal $R_A$ may be forwarded to the central resource 120 for generation of the authorization signal $S_A$.

Specifically, the gate function implies that the access module A blocks any access to the first digital storage unit M1 via the bi-directional wireless interface $I_w$ until an authorization signal $S_A$ for the relevant module $CM_1$ has been received in the module $CM_1$. The authorization signal $S_A$ may include an address field, which designates a specific module position, e,g, Adr#1, within the node 110. Thus, the node 110 can relate a given authorization signal $S_A$ to a certain module, say $CM_1$. As an alternative or a complement thereto, the authorization signal $S_A$ may include a unique identifier (e.g. a serial number) of a certain module, such as $CM_1$. Depending on the application, one or more further access conditions may need to be fulfilled before access to the first digital storage unit M1 is actually granted. However, this will be discussed in further detail below, for instance with reference to the FIGS. 3 and 4.

According to a preferred embodiment of the invention, the network interface $I_N$ is adapted to receive the authorization signal $S_A$. It is also preferable if the identification unit ID is adapted to indicate an active data transmission state $i_{ID}$, i.e. that an authorization signal $S_A$ has been received for the module $CM_1$.

According to a preferred embodiment of the invention, the access module A within the communication module $CM_1$ in turn contains an authentication sub-unit a, which is adapted to receive a pass phrase from a portable software carrier unit 130 via the bi-directional wireless interface $I_w$. The access module A may thereby block access to the first digital storage unit M1 via the bi-directional wireless interface $I_w$, until (in addition to the authorization signal $S_A$) an acceptable pass phrase has been received.

The pass phrase may very well be empty (or non-existent). Depending on any complementary security measures, the security levels for the pass phrase may be varied. For instance, in case the node 110 is provided with a relatively high degree of protection with respect to physical access, the requirements on the pass phrase may be released. However preferably, the pass phrase at least includes a static segment, i.e. a predetermined, permanent sequence of characters (letters, numbers or symbols). In addition, or as a complement, to the static segment, the pass phrase may include a dynamic segment, i.e. a sequence of characters (letters, numbers or symbols) which typically varies from one log-on to another. The dynamic part of the pass phrase is calculated outside of the communications module $CM_1$, preferably in the portable software carrier unit 130 and the authorization unit respectively. Access to the first digital storage unit M1 is then only granted if there is a match between the results of these two calculations. The pass phrase may also include a cyclic redundancy checksum (CRC). According to a preferred embodiment of the invention, the CRC is based on (i.e. calculated from) data $D_i$, which is to update the contents of the digital storage M. Consequently, the integrity of the data transferred to the first digital storage unit can be guaranteed.

Given the various types of pass phrases above, different security levels (open, protected, closed, closed-confirm) may be defined with respect to the accessibility to the first digital storage unit M1. A first security level, open, implies that the contents of the first digital storage unit M1 is freely accessible for any kind of modification and read-out. It is worth mentioning though, that the first digital storage unit M1 may be divided into different sectors, and preferably, the sectors pertaining to comparatively critical functions of the node 110 are allocated a security level above the first security level. A second security level, protected, implies that a static password is required in order to read out or store data in the first digital storage unit M1. This security level may hence be used to safeguard against unintentional modifications of the data therein. A third security level, closed, implies that both a static password and a dynamic password are required to obtain access to the first digital storage unit M1. Preferably, this security level is allocated to those sectors of the first digital storage unit M1 that pertain to relatively central functions in the node 110, such as setting of control parameters and erasure of event logs. A fourth security level, closed-confirm, implies that a valid combination of a static password, a dynamic password and a CRC must be entered. This security level is appropriate when performing software and/or firmware upgrades, since it ensures that only a specific set of data (e.g. that which has been obtained from an authorized provider) can be stored into the first digital storage unit M1.

According to a preferred embodiment of the invention, the identification unit ID includes a first optical indicator $i_{D1}$, which indicates whenever the bi-directional interface $I_w$ is open for access to the first digital storage unit M1. For instance, a light emitting diode (LED) may thus inform a service operator that an acceptable pass phrase has been entered. Moreover, it is preferable if the identification unit ID contains a second optical indicator $i_{D2}$, which indicates that data $D_i$ or $D_o$ is being transmitted over the bi-directional wireless interface $I_w$. The service operator may thereby obtain additional useful information, such as when a particular download has been completed.

Instead of providing a separate first optical indicator $i_{D1}$ and second optical indicator $i_{D2}$, these indicators may be combined into a single optical indicator, which has two distinctive signaling behaviors. Moreover, this indicator is preferably adapted to indicate an active data transmission state $i_{ID}$ in response to an authorization signal having been received with respect to the communication module, i.e. a third distinctive signal.

Figure 2:
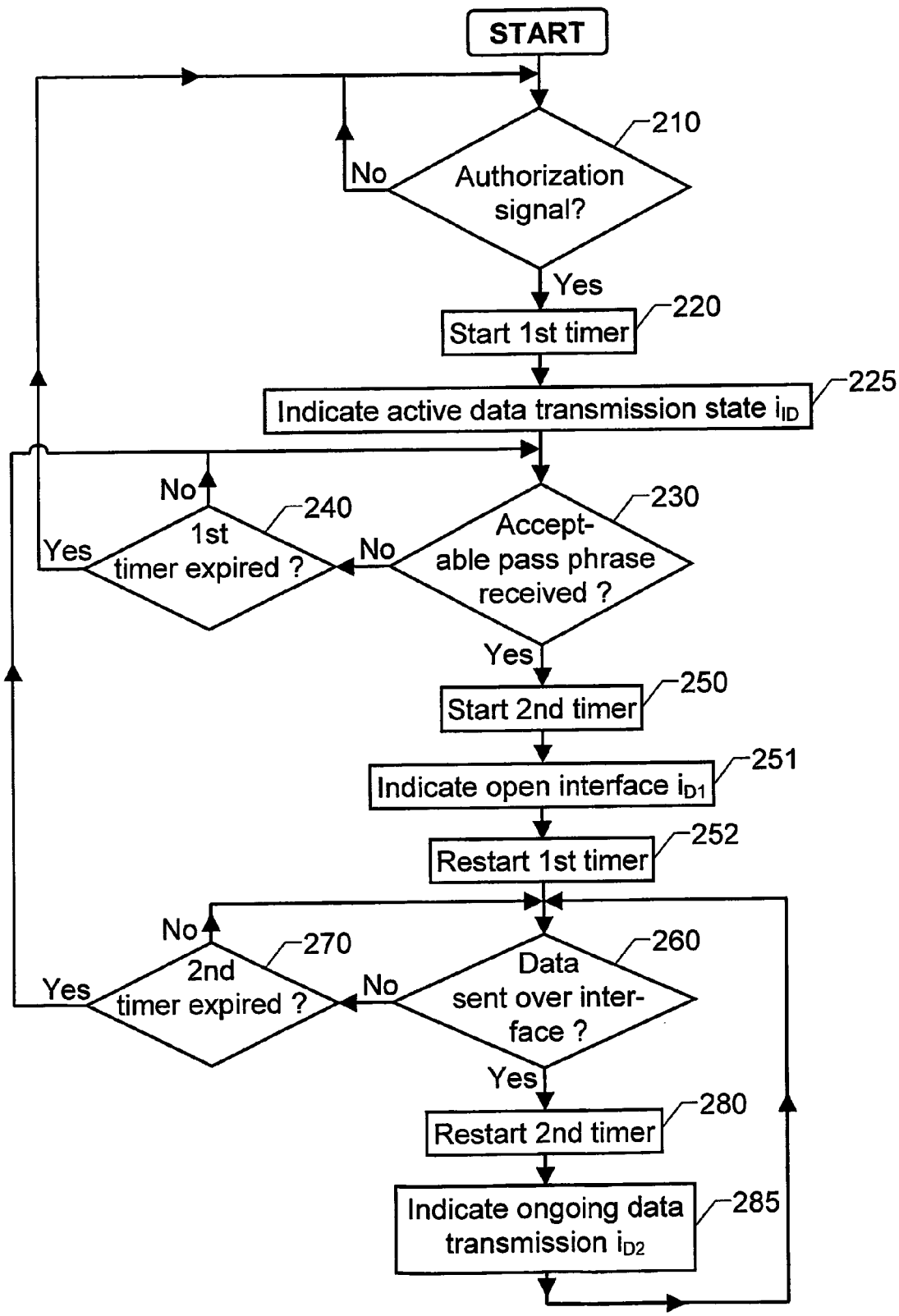
FIG. 2 illustrates, by means of a flow diagram, a method of communicating with a communication module according to an embodiment of the invention, FIG. 3 exemplifies, by means of a first sequence diagram, a data transmission scenario between a portable software carrier unit and a communication module according to an embodiment of the invention, and FIG. 4 exemplifies, by means of second sequence diagram, a data transmission scenario between a portable software carrier unit and a communication module according to an embodiment of the invention.

A method of communicating with a communication module according to an embodiment of the invention will now be described with reference to FIG. 2. A first step 210, investigates whether an authorization signal has been generated with respect to a relevant communication module, and if so the procedure continues to a step 220. Otherwise, the procedure loops back and stays in the step 210. The step 220 starts a first timer having a relatively long duration. The first timer has the function of releasing the access to the communication module, typically after a completed data transfer, however also after a predetermined period of inactivity. Next, a step 225 indicates an active data transmission state $i_{ID}$, i.e. that an authorization signal has been generated for the communication module in question.

Subsequently, a step 230 investigates whether an acceptable pass phrase has been received via the bi-directional interface, for example from a portable software carrier unit. As already mentioned, this step is optional, which means that the pass phrase may be empty (see e.g. the first security level above). In case the condition checked in step 230 is not fulfilled, a step 240 investigates whether the first timer has expired, and if so the procedure loops back to the step 210. Otherwise, the procedure stays in the step 230 to 240 loop until an acceptable pass phrase is received or the first timer expires. In the first case, a step 250 starts a second timer (having a relatively short duration). The purpose of the second timer is to limit the period between the entry of a valid pass phrase and initiating data transmission. The second timer also initiates the turn-off process for the bi-directional wireless interface after a completed data transmission. Next, a step 251 activates an indication signal $i_{D1}$ indicating that the bi-directional wireless interface is open for access to the first digital storage unit. Afterwards, a step 252 restarts the first timer.

Following step 252, a step 260 investigates whether data is being transmitted over the interface, and if this is not the case, a step 270 investigates whether the second timer has expired. An affirmative answer here results in that the procedure loops back to the step 230, where the user is prompted to re-enter a valid pass phrase. If, however, the question posed in step 260 is answered affirmative, a step 280 restarts the second timer. Subsequently, a step 285 indicates that data is currently being transmitted, for instance via a particular LED-signal. Thereafter, the procedure returns to step 260 again.

According to alternative embodiments of the invention, two or more of the process steps described above may be executed in parallel or in mutually reversed order. Specifically, this is true with respect to the sub-sequences of steps 220 and 225, 250-252 respective 280 and 285.

Furthermore, all of the process steps, as well as any sub-sequence of steps, described with reference to the FIG. 2 above may be controlled by means of a computer program being directly loadable into the internal memory of a computer, which includes appropriate software for controlling the necessary steps when the program is run on a computer. Furthermore, such computer programs can be recorded onto arbitrary kind of computer readable medium as well as be transmitted over arbitrary type of network and transmission medium.

Figure 3:
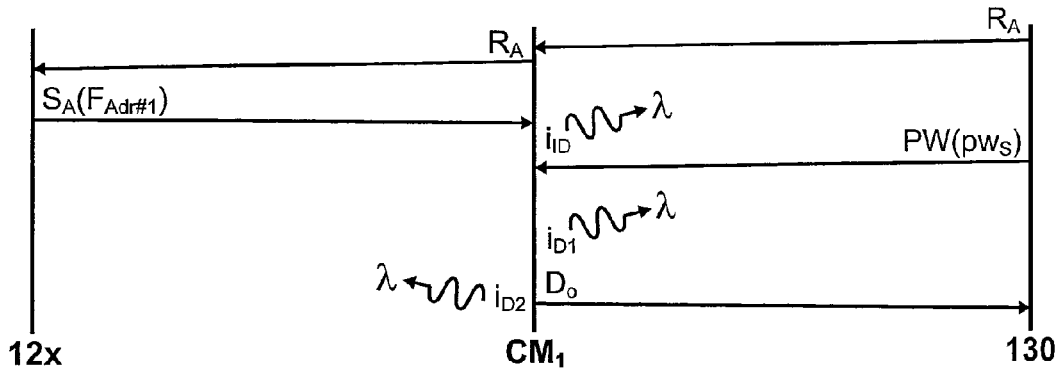

FIG. 3 exemplifies, by means of a first sequence diagram, a data transmission scenario between a portable software carrier unit 130 and a communication module $CM_1$ according to an embodiment of the invention.

First, an access request signal $R_A$ is sent out by the portable software carrier unit 130. This signal $R_A$ is received by the node 110 and forwarded to a relevant authorization unit 12x. Provided that the access request signal $R_A$ is accepted, an authorization signal $SA(F_{Adr\#1})$ is generated with respect to the communication module $CM_1$. Here, an address field $F_{Adr\#1}$ in authorization signal $S_A(F_{Adr\#1})$ designates a module position Adr#1 at which the communication module $CM_1$ is located within a particular node.

The module $CM_1$ then indicates $i_{ID}$ an active data transmission state, for example by lightning a first LED in its identification unit ID. A service operator is prompted to enter a pass phrase $PW(pw_s)$ via the portable software carrier unit 130. For example, the pass phrase $PW(pw_s)$ includes a static segment $pw_s$. However in the general case, the pass phrase $PW(pw_s)$ is optional and may thus be left out. Subsequently, an open bi-directional wireless interface is indicated $i_{D1}$, for instance by lightning a second LED in the identification unit ID. Next, data is transmitted. Here, the data is read out $D_o$ from the module's $CM_1$ first digital storage unit to the portable software carrier unit 130. In parallel with this, an optical indicator $i_{D2}$, such as a third LED in the identification unit ID, is activated.

Figure 4:
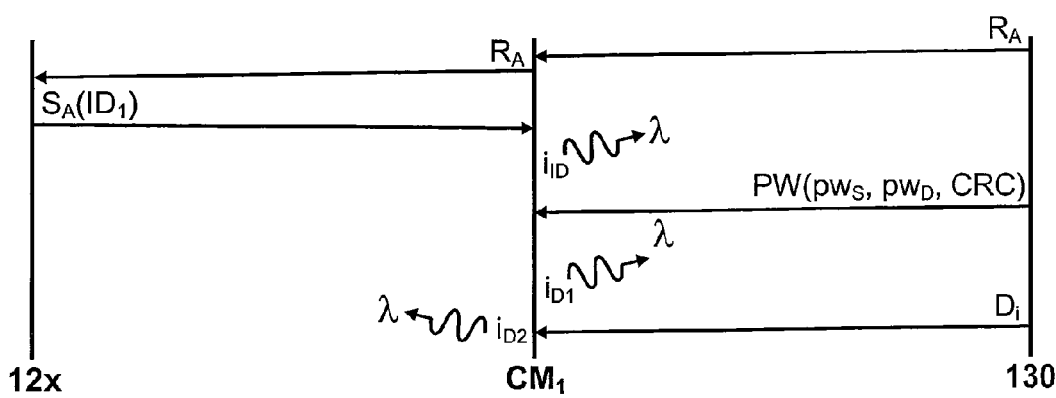

FIG. 4 exemplifies, by means of second sequence diagram, another data transmission scenario between the portable software carrier unit 130 and a communication module $CM_1$ according to an embodiment of the invention.

Again, an access request signal $R_A$ is initially sent out by the portable software carrier unit 130. The access request signal $R_A$ is received by the module $CM_1$ and forwarded to a relevant authorization unit 12x, external or internal. This unit 12x then generates an authorization signal $S_A(ID_1)$, which designates $ID_1$ the module $CM_1$. In response to the authorization signal $S_A(ID_1)$, the module indicates $i_{ID}$ an active data transmission state.

Next, the service operator enters a pass phrase $PW(pw_s, pw_D, CRC)$, preferably via the portable software carrier 130. The pass phrase $PW(pw_s, pw_D, CRC)$ includes a static segment $pw_s$, a dynamic segment $pw_D$, and a cyclic redundancy checksum CRC. Then, an open bi-directional wireless interface is indicated $i_{D1}$. Subsequently, data transmission may be initiated. In this case, data $D_i$ is transmitted from the portable software carrier unit 130 and stored into the module's $CM_1$ first digital storage unit. The ongoing data transfer is indicated by means of an optical indicator $i_{D2}$.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of communicating with a communication module being removably connected to a node in a communications network, the module being adapted to perform a primary function and a secondary function, the method comprising:

receiving an access request signal in the module from a portable software carrier unit;

receiving an authorization signal from an authorization unit, the authorization signal identifying the module and instructing the module to grant access to the portable software carrier unit;

exchanging data between the module and the portable software carrier unit via a bi-directional optical interface of the module while the module performs the primary function over the network via a network interface of the module, the data including information pertaining to accomplishment of the primary function and being exchanged independently of the primary function;

receiving at least one piece of information pertaining to the accomplishment of the primary function via the bi-directional optical interface;

storing temporarily the at least one piece of information in a second digital storage unit in the communication module;

resetting the communication module; and altering the contents of the first digital storage on basis of the at least one piece of information, wherein the primary function includes receiving incoming network traffic via the network interface and performing switching and/or routing operations on the received network traffic.

2. A method according to claim 1, wherein the authorization signal includes an address field which designates a specific module position within the node.

3. A method according to claim 1, wherein the authorization signal includes a unique identifier of the module.

4. A method according to claim 1 wherein the access request signal comprises a pass phrase that is received via the bi-directional optical interface.

5. A method according to claim 4, wherein the pass phrase includes a static segment.

6. A method according to claim 4 wherein the pass phrase includes a dynamic segment, the method comprising calculating the dynamic segment in the portable software carrier unit and a central resource respectively.

7. A method according to claim 4 wherein the pass phrase includes a cyclic redundancy checksum, the cyclic redundancy checksum being based on data which is to update the contents of a first digital storage in the module.

8. A method according to claim 1 further comprising updating of the contents of a first digital storage unit in the module via the bi-directional optical interface.

9. A method according to claim 8, further comprising:
receiving at least one control command via the bi-directional optical interface; and
altering at least one parameter in the first digital storage unit pertaining to the accomplishment of the primary function on basis of the at least one control command.

10. A method according to claim 1 further comprising reading out data from a first digital storage unit in the module via the bi-directional optical interface.

11. A method according to claim 10, further comprising:
receiving a request for status information via the bi-directional optical interface; and
transmitting a status report on basis of the request, the status report including data pertaining to at least one parameter of the primary function.

12. A method according to claim 8, wherein the primary function is a first primary function and wherein updating of the contents of the first digital storage unit via the bi-directional optical interface changes the first primary function to a second primary function.

* * * * *